3,002,945
THERMOSETTING COMPOSITION OF UNSATURATED POLYESTER RESIN AND POLYTHIO MERCAPTAN

Edward Rolle, San Diego, William L. Mackie, Oxnard, and John Q. Tabor, Jr., Los Angeles, Calif., assignors to the United States of America as represented by the Secretary of the Navy
No Drawing. Filed June 10, 1957, Ser. No. 664,866
1 Claim. (Cl. 260—28.5)
(Granted under Title 35, U.S. Code (1952), sec. 266)

The invention described herein may be manufactured and used by or for the Government of the United States of America for governmental purposes without the payment of any royalties thereon or therefor.

The present invention relates to an improved thermosetting plastic compound which is characterized not only by the ease with which it may be cast but also by the excellent mechanical, optical, and electrical qualities exhibited by articles composed thereof.

It is recognized that polyester resins, as a group, do not require the relatively high molding pressures and/or temperatures employed in the polymerization of monomeric materials. The latter, such for example as methyl methacrylate, will not normally cure within a commercially acceptable time period without the application of heat plus a catalytic agent such as benzoyl peroxide, and even then the exothermic reaction frequently entraps gas in the casting which raises the product rejection rate to prohibitive levels. Furthermore, polymerization involves the establishment of primary valence bonds between adjacent molecules, and as these molecules link up, they move closer together. The consequent over-all shrinkage may reach as high as 20% with some monomers, and since this action is counter to the exothermic effect, very high stresses are developed which tend to produce cracks as the casting solidifies. Although many plastic materials of the above group have desirable qualities, they are difficult to fabricate by commercial manufacturing processes because of a strong adhesion to the mold, or because elaborate instrumentation is needed to maintain a critical balance between the permissible speed of reaction and the maximum exotherm which the substance will support without lowering the quality of the end product.

The above disadvantages may be obviated, in accordance with a feature of the present invention, by the use of a thermosetting material composed of an unsaturated polyester resin of relatively high molecular weight, to which has been added a partially polymerized polymer, such as synthetic rubber, and a suitable oxidizing agent. By choosing relative proportions of these ingredients within the range set forth herein, a product is obtained which not only possesses excellent molding characteristics in that it can be poured at room temperature, but which also is substantially free from the cracks or entrapped gas which when present tend to impair its optical qualities and mechanical strength.

Whereas a thermoplastic material prior to molding is already completely cured and does not undergo any further polymerization during the molding process, thermosetting compounds such as described herein undergo a chemical change during the molding operation to become substantially infusible and insoluble. Applicants' material is accordingly polymerized by a reaction which is strictly chemical in nature, and this process may be precisely controlled by selecting relative proportions for the constituents between the limits herein set forth. This has the effect of determining the rate at which exothermic heat is generated during polymerization, so that the temperature at the center of the plastic mass may be maintained below the level at which fissuring and cracking of the material would otherwise occur.

One object of the present invention, therefore, is to provide an improved plastic material from or with which objects of various sizes and configurations may be cast, molded, impregnated, or encapsulated.

Another object of the invention is to provide a thermosetting plastic compound having a predeterminable rate of polymerization.

A further object of the invention is to provide a thermosetting compound from which may be formed objects having improved optical, mechanical, and/or electrical characteristics.

A still further object of the invention is to provide a thermosetting plastic compound which may be cast or molded at room temperature without the application of pressure or heat, and which will polymerize within a commercially feasible time period without the necessity of maintaining any regulatory control over the hardening process.

Other objects and many of the attendant advantages of this invention will be readily appreciated as the same becomes better understood by reference to the following detailed description.

A plastic material composed of the following ingredients within the respective ranges indicated has been found to give the molding characteristics set forth above and to yield a product the properties of which are in part determinable in accordance with the particular constituent proportions selected:

| Ingredient: | Range (percent by weight) |
| --- | --- |
| Laminac Resin #4110 | 88–93 |
| Hydrogenated terphenyls (HB40) | .5–1.5 |
| Benzyl alcohol | .25–3 |
| Benzyl ether | .5–5 |
| Benzaldehyde | .5–3 |
| Thiokol (LP–3) | .5–3 |
| Dioctyl phthalate | .5–5 |
| Lupersol DDM | .5–4 |

Laminac Resin #4110 is a trade name for an unsaturated polyester resin having styrene as a reactive monomer, the resin being derived from propylene glycol, maleic anhydride and phthalic anhydride, the ratio of maleic anhydride to phthalic anhydride being relatively high and containing a small amount of paraffin wax.

Hydrogenated terphenyls are a group of such terphenyls to a concentration of 40% in a suitable vehicle. The chemical is manufactured under the trade designation of HB40.

LP–3 denotes a polythio polymercaptan derived from 98 mole % of bis (2-chloroethyl) formal and 2 mole % of trichloropropane. This material is fully described in U.S. Patent 2,466,963.

Lupersol DDM is a trade name for a mixture of methyl ethyl ketone peroxide 60% and hydroperoxide in dimethyl phthalate.

The above listed chemicals are combined in the order given, the oxidizer (Lupersol DDM) being added last. The mixture is agitated for a period sufficiently long to ensure thorough blending of the ingredients (for a 500 ml. batch, this mixing time will approximate three (3) minutes) at which point the compound has the viscosity of maple syrup. It is then ready to be poured into a mold, where it remains at room temperature until polymerization is complete. While the time required for hardening depends upon the size and shape of the object being molded, a range of 5–15 hours may be given purely as an example.

By varying the percentage of each ingredient (especially of the oxidizing agent DDM) within the respective ranges set forth above, the rate of generation of exothermic heat during the hardening process may be very precisely controlled. This means that the temperature at the center of the mass may be held below the point at which stresses of sufficient magnitude would be produced within the material as otherwise to result in fissures or cracks in the finished product.

It will now be appreciated that a process is provided herein which permits the composition of the plastic material to be chosen in accordance both with the characteristics of the mold itself as well as by the use to which the end product is to be applied. For example, assume that a product is desired which could be described as solid or massive, and further assume that the mold for casting this object is composed of a relatively thin material having good heat transfer characteristics. Under such circumstances, the plastic composition would be formulated by selecting a particular percentage of each ingredient within the indicated limits, such that the resulting mixture would generate during the chemical reaction only sufficient exothermic heat to carry forward the polymerization plus a small excess. Thus, the temperature is held below the critical level at which the opposing forces of expansion and contraction (respectively caused by exothermic action and molecular cross-linkage) produce such extreme stresses within the object being cast that they can only be relieved by a physical displacement of adjacent areas.

In order that those skilled in the art may fully understand the manner in which the present invention may be carried into effect, the following examples are given solely for the purpose of illustration. All percentages are by weight.

*Example 1*

| | |
|---|---|
| Laminac resin #4110 | 92.75 |
| Hydrogenated terphenyls (HB40) | 1.00 |
| Benzyl alcohol | 0.75 |
| Benzyl ether | 1.00 |
| Benzaldehyde | 1.00 |
| Thiokol (LP-3) | 2.00 |
| Dioctyl phthalate | 0.50 |
| Lupersol DDM | 1.00 |

The product obtained had a tensile strength of 2550 lbs./sq. in. and an elongation of 7.00%. The material exhibited no measurable impedance to the passage of radio-frequency energy thereto. Optical properties were dependent upon the care used to avoid introduction of air during molding and upon the extent of the final polishing process.

*Example 2*

| | |
|---|---|
| Laminac resin #4110 | 92.50 |
| Hydrogenated terphenyls (HB40) | 1.00 |
| Benzyl alcohol | 0.50 |
| Benzyl ether | 0.75 |
| Benzaldehyde | 1.00 |
| Thiokol (LP-3) | 2.00 |
| Dioctyl phthalate | 1.50 |
| Lupersol DDM | 0.75 |

Tensile strength was 6140 lbs./sq. in. Elongation was 4.00%. Excellent electrical characteristics. Improved optical quality over Example 1.

*Example 3*

| | |
|---|---|
| Laminac resin #4110 | 92.50 |
| Hydrogenated terphenyls (HB40) | 1.00 |
| Benzyl alcohol | 0.50 |
| Benzyl ether | 0.50 |
| Benzaldehyde | 1.00 |
| Thiokol (LP-3) | 2.00 |
| Dioctyl phthalate | 1.75 |
| Lupersol DDM | 0.75 |

Tensile strength was 5020 lbs./sq. in. Elongation 8.00% Specific gravity 1.24. The product also exhibited a Rockwell Hardness of R-111. Excellent electrical and optical qualities.

The following table illustrates the manner in which a compound formed in accordance with Example 3 above compares with known commercial plastics insofar as the designated mechanical properties are concerned:

| Compound | Tensile Strength, lbs./sq. in. | Specific Gravity | Rockwell Hardness |
|---|---|---|---|
| Invention Compound #3 | 5,020 | 1.24 | R-111 |
| Cellulose Acetate | 3,000 | 1.34 | R-72 |
| Ethyl Cellulose | 3,000 | 1.12 | M-20 |
| Vinylidene Chloride | 3,000 | 1.75 | M-50 |
| Methyl-Methacrylate | 8,000 | 1.19 | M-92 |
| Phenol-Formaldehyde | 6,000 | 2.00 | M-99 |
| Silicone | 3,000 | 1.65 | M-65 |

It will be apparent from a consideration of the above examples that we are able to obtain a completely polymerized product which may be cast at ordinary room temperatures of about 20° to 30° centigrade. Unless the teaching of the present disclosure is employed, it is necessary to make use of much higher temperatures to completely polymerize or "cure" resins of the polyester and other types. This is because no "curing" is involved in applicants' process, while commercial plastics normally do require the application of heat and/or pressure to serve as a substitute for certain ingredients which are lacking in the compound, and which, by their absence, prevent the chemical reaction from progressing to completion. The plastic mixture conceived by us is "complete" in the sense that it is a balanced chemical compound which polymerizes without "curing." Thus, our invention makes it possible to produce castings or other articles without the use of expensive ovens, electrically heated molds, high compression during molding, or similar expedients formerly considered essential to complete the casting cycle.

Moldings or castings produced in accordance with our invention may have any suitable filler, dye, or pigment incorporated therein, including, for example, alpha cellulose pulp, wood flour, glass fibers, asbestos fibers, titanium oxide, etc. Laminated materials may also be prepared utilizing the resins disclosed herein, and such laminated materials may contain paper or fabric composed of cellulose fibers, glass fibers, asbestos fibers, synthetic fibers, etc.

Obviously many modifications and variations of the present invention are possible in the light of the above teachings. It is therefore to be understood that within the scope of the appended claims the invention may be practiced otherwise than as specifically described. A solution of cobalt naphthenate in any oily medium may be utilized as a catalyst to cause the oxidizing agent (DDM) to react more rapidly and hence shorten the time required for completion of the chemical reaction.

We claim:

A plastic product characterized by high tensile strength, exceptional hardness and unusually good optical and electrical properties, such product being formed by molding without added pressure or temperature a mixture by weight of the following ingredients in substantially the proportions set forth:

| | |
|---|---|
| Unsaturated polyester resin having styrene as a reactive monomer, the resin being derived from propylene glycol, maleic anhydride and phthalic anhydride, the ratio of maleic anhydride to phthalic anhydride being relatively high and containing a small amount of paraffin wax | 88–93 |
| A polythio polymercaptan derived from 98 mole percent of bis (2-chloroethyl) formal and 2 mole percent of trichloropropane | 0.5–3 |
| Benzyl alcohol | 0.25–3 |
| Benzyl ether | 0.5–5 |
| Benzaldehyde | 0.5–3 |
| Hydrogenated terphenyl | 0.5–1.5 |
| Dioctyl phthalate | 0.5–5 |
| Solution of methyl ethyl ketone peroxide and hydroperoxide in dimethyl phthalate | 0.5–4 | such that the exothermic temperature developed during polymerization remains below the critical level at which stresses within the mass due in part to molecular cross-linkages would otherwise tend to cause cracks or fissures to appear in the finished product.

References Cited in the file of this patent

UNITED STATES PATENTS

| Re. 23,843 | Oace | June 29, 1954 |
| 2,229,602 | Raynolds | Jan. 21, 1941 |
| 2,249,686 | Dykstra | July 15, 1941 |